(12) United States Patent
Li et al.

(10) Patent No.: US 8,285,745 B2
(45) Date of Patent: Oct. 9, 2012

(54) USER QUERY MINING FOR ADVERTISING MATCHING

(75) Inventors: Hua Li, Beijing (CN); HuaJun Zeng, Beijing (CN); Jian Hu, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 11/849,136

(22) Filed: Aug. 31, 2007

(65) Prior Publication Data

US 2009/0063461 A1 Mar. 5, 2009

Related U.S. Application Data

(60) Provisional application No. 60/892,497, filed on Mar. 1, 2007.

(51) Int. Cl.
*G06F 17/30* (2006.01)
(52) U.S. Cl. .......................... 707/776; 707/706; 707/739
(58) Field of Classification Search ............... 707/3, 751, 707/706, 739, 776
See application file for complete search history.

(56) References Cited

U.S. PATENT DOCUMENTS

| | | | |
|---|---|---|---|
| 5,870,746 A * | 2/1999 | Knutson et al. ............... 707/101 |
| 5,987,464 A | 11/1999 | Schneider | |
| 6,269,361 B1 | 7/2001 | Davis et al. | |
| 7,181,447 B2 | 2/2007 | Curtis et al. | |
| 2003/0014399 A1 * | 1/2003 | Hansen et al. ...................... 707/3 |
| 2003/0074369 A1 * | 4/2003 | Schuetze et al. .......... 707/103 R |
| 2003/0078928 A1 * | 4/2003 | Dorosario et al. .............. 707/10 |
| 2003/0120649 A1 * | 6/2003 | Uchino et al. ...................... 707/5 |
| 2006/0230035 A1 * | 10/2006 | Bailey et al. ....................... 707/5 |
| 2006/0242013 A1 * | 10/2006 | Agarwal et al. ................. 705/14 |
| 2008/0195601 A1 * | 8/2008 | Ntoulas et al. ..................... 707/5 |
| 2008/0255935 A1 * | 10/2008 | Madhavan et al. .............. 705/14 |
| 2009/0006359 A1 * | 1/2009 | Liao .................................. 707/5 |
| 2009/0006360 A1 * | 1/2009 | Liao et al. .......................... 707/5 |

OTHER PUBLICATIONS

PCT Search Report for PCT Application No. PCT/US2008/055581, mailed Jul. 31, 2008 (13 pages).

* cited by examiner

*Primary Examiner* — Mahesh Dwivedi (74) *Attorney, Agent, or Firm* — Lee & Hayes, PLLC (57) ABSTRACT

Systems and methods to determine relevant keywords from a user's search query sessions are disclosed. The described method includes identifying search session logs of a user, segmenting the search session logs into one or more search sessions. After the segmentation, the search sessions are analyzed to compose a list of semantically relevant keyword sets including at least a first keyword set and a second keyword set. The described method further includes determining a semantic relevance between the first and second keyword sets according to the frequency at which the first and second keyword sets are reported in the query results and displaying one or more semantically high relevant keyword sets after being filtered by a threshold.

17 Claims, 5 Drawing Sheets

USER QUERY MINING FOR ADVERTISING MATCHING

CROSS REFERENCE TO RELATED APPLICATIONS

This application claims the priority to, and the benefit of, U.S. Provisional Application No. 60/892,497 filed Mar. 1, 2007, titled "User Query Session Mining for Ads Broad Match"

BACKGROUND

A global computer network, such as the Internet, provides an opportunity for advertisers to target Internet users within the network for marketing purposes. A user commonly searches for and browses content on the network by entering one or more search terms in a search query, typically implemented in search websites. The content that the user searches can include articles, web pages, emails, or other Internet accessible content containing the search term provided by the user. Many of the advertisements that the user is subjected to are based on search terms entered into a search engine.

The advertisements are generated by one or more agents, or advertisement engines, operating on web-servers for generating and displaying advertisements to users. Many search engines operate in cooperation with an advertisement engine, to display advertisements (ads) in response to the search terms entered by the user in the search query. The advertisement engine has a database of ads, from which the ads are selected based upon relevance to the search term provided by the user. In the case of paid search auctions, an advertiser bids on one or more search terms that relate to the ads. The paid search auction returns ads of the advertiser that are relevant to user queries according to the bidding search terms. For this, an advertiser needs to accurately match a user's query to the advertiser's search terms based on the relevancy of the search terms. Since each user can input widely varying search terms when searching for similar or identical search content, the matching of the user's query to the advertiser's search terms is difficult to achieve.

SUMMARY

Systems and methods to determine relevant keyword set from a user's search query sessions are disclosed. In one aspect, the methods include parsing a search session log of a user and segmenting the search session log into a search session having a first keyword set and a second keyword set. The methods further include determining a semantic relevance between the first and the second keyword sets according to the frequency at which both the first and second keyword sets are reported in the search results and displaying one or more semantically relevant keyword sets to the user based on the relevance.

This summary is provided to introduce simplified concepts of user query session mining for matching advertisements, which is further described below in the Detailed Description. This summary is not intended to identify essential features of the claimed subject matter, nor is it intended for use in determining the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure relates to methods and systems for determining one or more relevant keyword sets in a query provided by a user. The user can search for and browse content on a global computer network, like the Internet, by entering keywords using a search engine. Many search engines work in cooperation with an advertisement agency which further implements advertisements on the Internet through an advertisement engine. The advertisements are generated and displayed to one or more users based on an association with a plurality of keywords, collectively referred to as keyword sets. Based on such an association, the advertisement engine displays advertisements (ads) related to one or more keyword sets provided as input in the query. Moreover, the search engines can create and maintain such keyword sets that are correlated to specific searches or search results. These keyword sets, interchangeably referred to as the advertiser's keyword set, can be used commercially by offering the keyword sets to the advertisers for some consideration. Once such keyword sets are reserved by advertisers; any user entering a search query would generate search results that are associated with the keyword set and in turn the generated result. The advertisers can have ads related to the one or more keyword sets. However, matching the user's query to the advertiser's keyword sets can be difficult to achieve.

The methods and systems disclosed in the following description relate to determining semantically relevant keyword sets from the user's query to match the advertiser's keyword sets. The methods include identifying search session logs of the user, segmenting the identified search session logs into one or more search sessions based on a predetermined session time interval. The methods further include determining one or more semantically related keyword sets based on the rate at which the keyword sets occur in the user queries during each search session. In addition, a similarity threshold can be computed to filter the one or more keyword sets with high semantic relevance to match the advertiser's keyword sets.

Exemplary Computing Environment

Figure 1:
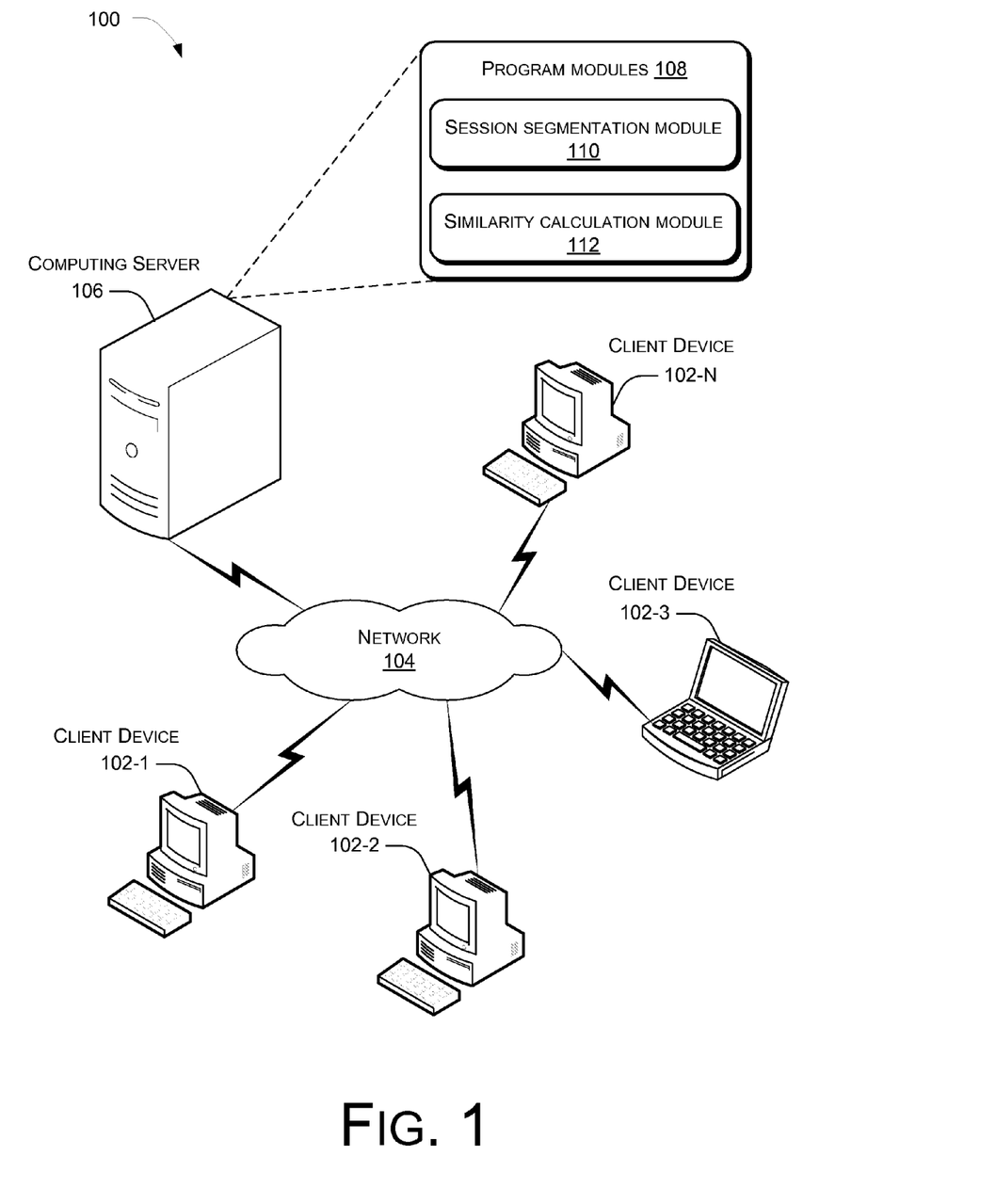
FIG. 1 illustrates an exemplary computing environment.

FIG. 1 illustrates an exemplary computing environment 100 which can be used to implement the techniques described herein, and which may be representative, in whole or in part, of the elements described herein. The computing environment 100 is an example of a computing environment and is not intended to suggest any limitation to the scope of use and/or functionality of the computer and network architectures.

The computing environment 100 can include a plurality of client devices 102-1, 102-2, 102-3, . . . 102-$n$ (collectively referred to as client devices 102) communicatively connected through a network 104 with a computing server 106. The client devices 102 may be implemented as any of a variety of conventional computing devices, including, for example, a server, a desktop PC, a notebook or a portable computer, a workstation, a mainframe computer, a mobile computing device, an entertainment device, or an Internet appliance, etc.

The network 104 may be a wireless or a wired network, or a combination thereof. The network 104 may also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

The computing server 106 can be, for example, a general purpose computing device, a server, a cluster of servers, mainframes, etc. The computing server 106 can be configured to receive one or more queries from the client devices 102. The computing server 106 can be further configured to determine semantically relevant keyword sets from the queries received from the client devices 102. The semantically relevant keyword sets are then displayed to the client devices 102 by the computing server 106.

In one implementation, the computing server 106 can be configured to execute a session segmentation module 110 and a similarity calculation module 112 to determine semantically relevant keyword sets in the user queries received from any one or more of the client devices 102. Each keyword set can include a single or multiple keywords, a compound term, a hyphenated term, a phrase, or an entire query. Each query can be a single search term or a list of search terms that may or may not have connectors like AND, OR, etc. between the search terms.

The session segmentation module 110 may be configured to identify a user and one or more search session logs of the user. The search session logs may include a collection of one or more records or information related to search queries during a time interval between the user logging in and logging out of the client device 102. In one implementation, the session segmentation module 110 identifies the user using a globally unique identifier (GUID) or a universally unique identifier (UUID). The session segmentation module 110 further segments the identified search session logs into one or more search sessions. Each of the search sessions can include a series of related message exchanges or exchange of related search queries and respective search results between a computing server and a client device within a predetermined session time interval. The set of user queries occurring within the predetermined session time interval may be segmented as a search session with queries having a semantic relationship with each other. Thereby the session segmentation module 110 determines one or more semantically related keyword sets of the search queries entered during the search session by the user.

The similarity calculation module 112 can be configured to filter one or more semantically high relevant keyword sets from one or more semantically related keyword sets. The filtration can be performed using a similarity threshold 220 as a filter. In one embodiment, the similarity threshold can be computed by a threshold calculation module. The similarity calculation module 112 can be further configured to filter the semantically high relevant keyword sets after evaluating the similarity threshold against a similarity value. In one embodiment, the similarity calculation module 110 determines the similarity value between the semantically related keyword sets. In one implementation, the similarity value can be computed by either a mutual information analysis or a cosine similarity analysis. The computed similarity value is then compared with the similarity threshold and the keyword sets having similarity value greater than the similarity threshold can be identified as semantically high relevant keyword sets by the similarity calculation module 112.

Exemplary Computing Server

Figure 2:
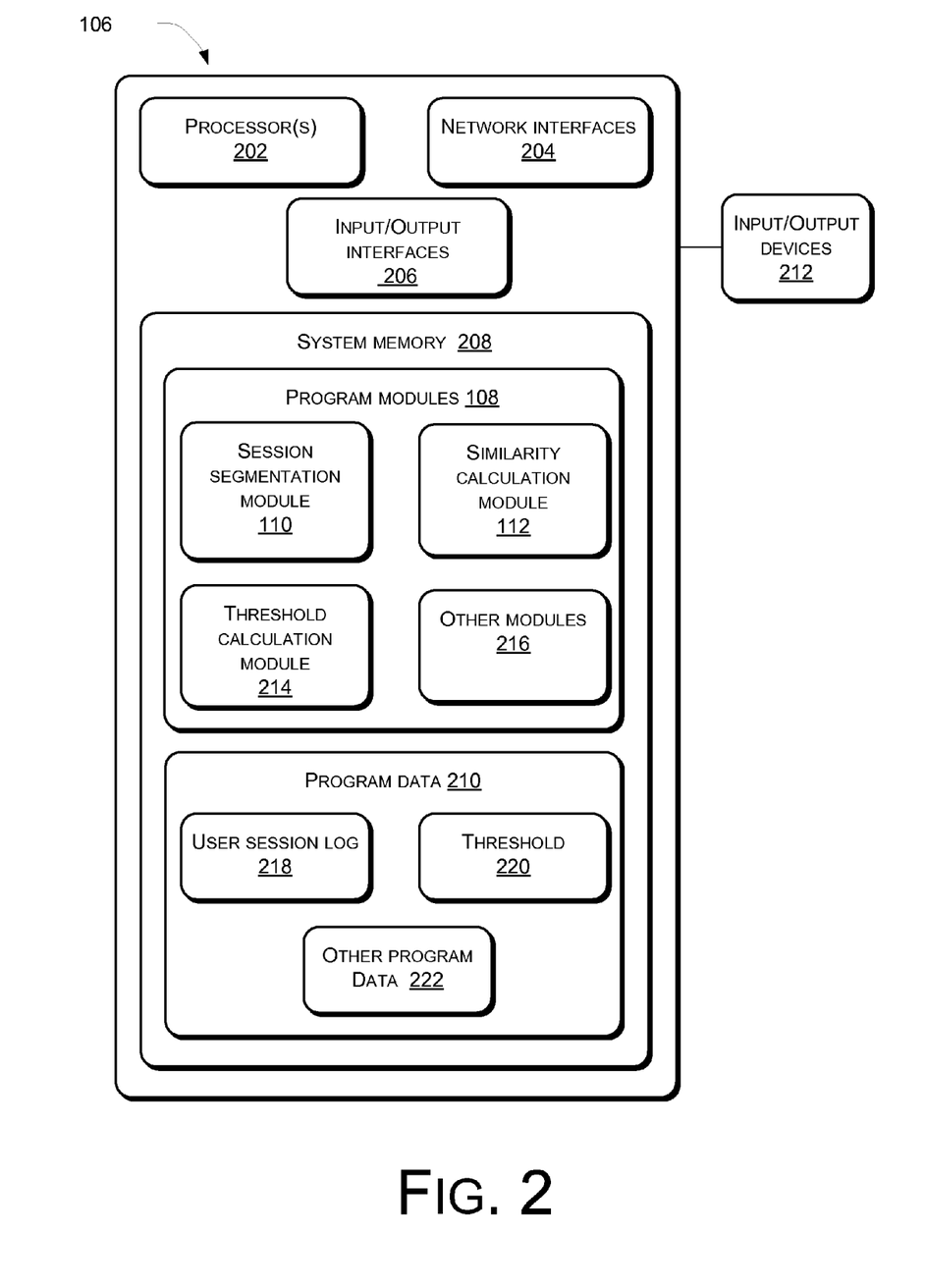
FIG. 2 illustrates an exemplary computing device for determining keyword set relevance.

FIG. 2 is an exemplary computing server 106 for determining keyword set relevance. The computing server 106 includes a processor 202, network interfaces 204, input/output interfaces 206, a memory 208 and input/output devices 212. The input/output interfaces 206 can include, for example, a scanner port, a mouse port, a keyboard port, etc to receive the user queries from the client devices 102. Input/output interfaces 206 can receive data such as, for example, user session log from input/output devices 212. The computing server 106 can be associated with an input/output device 212 either directly or indirectly in a network.

The memory 208 may be any computer-readable media in the form of volatile memory, such as Random Access Memory (RAM) and/or non-volatile memory, such as Read Only Memory (ROM) or flash RAM. The memory 208 typically includes data and/or program modules for determining keyword set relevance, the data, and modules being immediately accessible to and/or presently operated on by the processor 202. In one implementation, the memory 208 includes program modules 108 and program data 210.

The program modules 108 may include the session segmentation module 110, the similarity calculation module 112, the threshold calculation module 214, and other modules 216. The program data 210 can store parameters including user session log 218, threshold 220 and other program data 222.

The session segmentation module 110 identifies the user and the user's search session logs 218. In one implementation, the identification of the user can be accomplished by using either GUID or UUID, where GUID or UUID are stored as other program data 222 in the system memory 208. The session segmentation module 110 further sorts the identified search session logs to align data derived from at least one raw session log with each user. In one implementation, the session segmentation module 110 sorts the identified search session logs using an external sort process. In another implementation, the steps for identifying and sorting user's search session logs can be performed manually based on one or more options presentable to a system administrator or to other entities.

The session segmentation module 110 segments the sorted search session logs into one or more search sessions. The session segmentation module 110 analyzes each of the search sessions to compile one or more semantically related keyword sets for a given query or a series of the user queries. The search session logs can be segmented into one or more search sessions based on a predetermined session time interval. The segmented search sessions would be such that each session corresponds to a definite interval of time.

The segmented search session includes a list of similar keyword sets or semantically relevant keyword sets. The keyword sets can be such that each includes a plurality of keywords. The search session can be then analyzed to determine similar keyword sets or keyword sets that are at least related to each other. The determination can be performed using one or more keyword similarity calculation methods.

The similarity calculation module 112 determines similarity between one or more keyword sets based on frequency of occurrence of the keyword sets. In one implementation, the similarity calculation module 112 determines the similarity of the keyword sets using a similarity calculation method. The similarity calculation method aims at determining whether the keyword sets are semantically relevant or not.

In such a case, a search session having two queries can be considered as a single keyword set. Each of the two queries can be associated with a keyword set. Both keyword sets, say a first and a second keyword set, can be designated as u and v respectively. The keyword sets u and v can be combined together to form a keyword pair uv. It would be appreciated that the keyword pair uv can be represented as any combination of the first keyword set u and the second keyword set v, irrespective of the order of the keyword sets. In one implementation, keyword sets u and v can be combined together to form a keyword pair vu.

In one implementation, the similarity calculation method is based on frequency of occurrence of the keyword sets occurring as a keyword pair. The frequency of occurrence can be represented as f. Hence for the frequency of occurrence of the keyword pair uv, the frequency of occurrence for the keyword pair can be denoted as $f_{uv}$. In another implementation, the frequency of occurrence number $f_{uv}$ of the keyword pair is limited by a threshold value. In one implementation, the threshold value can be $f_m$, where $f_m$ is the minimum of the frequency occurrence of the first keyword set, say $f_u$, and frequency occurrence of the second keyword set, say $f_v$. In a preferred implementation, the semantically relevant keyword sets can be determined based on the relationship between the frequency occurrence number of keyword pair $f_{uv}$ and the minimum frequency occurrence number $f_m$, represented as:

$$f_{uv} > \sqrt{f_m} \tag{1}$$

The respective frequency occurrences are computed and semantically relevant keyword sets are determined based on the above relation (1). If the above relationship is satisfied, the keyword sets are determined as semantically relevant keyword sets. Conversely, if the above relationship is not satisfied, then the keyword sets are determined as semantically non relevant keyword sets.

In another implementation, the similarity calculation module 112 determines semantically relevant keyword sets based on the relationship between the frequency occurrence number of keyword pair $f_{uv}$ and the minimum frequency occurrence number $f_m$, represented as:

$$\sqrt{f_m} > f_{uv} > \sqrt[4]{f_m} \tag{2}$$

If the above relationship is satisfied, the keyword sets are determined o be semantically relevant. Additionally, the degree of relevance is measured in terms of a similarity value determined through mutual information analysis. Conversely, if the above relationship is not satisfied then the keyword sets may or may not be semantically relevant.

In one implementation, the calculation of the similarity value between the keyword sets by the mutual information analysis is derivable through the following equation (3):

$$MI(q_u, q_v) = p(q_u, q_v) * \log \frac{p(q_u, q_v)}{p(q_u) * p(q_v)} \tag{3}$$

In the above equation (3), $$p(q_u, q_v) = \frac{C_{u,v}}{N}, \ p(q_u) = \frac{C_u}{N}, \ p(q_v) = \frac{C_v}{N}$$

for the keyword sets u and v and N being the total number of query sessions. C indicates number of queries present including a keyword set. For example, $C_u$, $C_v$ and $C_{uv}$ would indicate the number of queries that include the keyword set u, v and keyword pair uv respectively, occurring in all sessions.

The relation between frequency of occurrence of the keyword sets can be depicted in various forms. In yet another implementation, the similarity calculation module 112 determine the semantically relevant keyword sets based on the relationship between the frequency occurrence number of keyword pair $f_{uv}$ and the minimum frequency occurrence number $f_m$, represented as:

$$f_{uv} <= \sqrt[4]{f_m} \tag{4}$$

On one hand, if the above relationship exists, the keyword sets are determined to be semantically relevant and the degree of relevance is measured in terms of the similarity value by the cosine similarity analysis. On the other hand, if the above relationship does not exist, the keyword sets are determined as semantically non relevant keyword sets.

In yet another implementation, the similarity value between the keyword sets can be calculated by the cosine similarity analysis, based on the following equation (5):

$$\cos(q_u, q_v) = \frac{\sum_{\forall qj} C_{u,j} \cdot C_{v,j}}{\sqrt{\sum_{\forall qj} C_{u,j}^2} \cdot \sqrt{\sum_{\forall qj} C_{v,j}^2}} \tag{5}$$

wherein the different variable possess the same meaning as indicated previously.

As indicated previously, highly relevant keyword set can be evaluated on the basis of the obtained semantically relevant keyword sets. The highly relevant keyword sets can be evaluated by comparing the similarity value for each of the search queries with a threshold value. On the basis of the comparison the respective keyword sets can be classified as highly relevant keyword sets or not.

In one implementation, the similarity calculation module 112 can further filter the semantically relevant keyword sets to obtain one or more semantically high relevant keyword sets (interchangeably called as the advertiser's keyword sets). The semantically relevant keyword sets are filtered against the similarity threshold referred to as threshold 220. The similarity calculation module 112 filters the semantically relevant keyword sets by comparing the similarity value associated with the semantically relevant keyword sets with the threshold 220. In one implementation, the similarity calculation module 112 can be determined by comparing the similarity value associated with the keyword sets. In cases where the similarity value exceeds the threshold 220, the similarity calculation module 112 classifies the associated keyword sets as semantically highly relevant keyword sets. The semantically highly relevant keyword sets are considered to be filtered only when the similarity value of the semantically relevant keyword sets exceeds the threshold 220.

In one implementation, the threshold 220 can be determined by the threshold calculation module 214. The threshold 220 can be a minimal value derivable through one or more of the expressions described above. Examples of such threshold value include, but are not limited to, a mutual information threshold or a cosine similarity threshold, and the like. The threshold calculation module 214 identifies one or more search session logs referred to as training search session logs of the user.

In one implementation, the training search session logs can be identified after the user is identified either by UUID or GUID. The identified training search session logs of the user are segmented into one or more training search sessions based on the predetermined time interval. In particular, the training search session logs are segmented into one or more training search sessions based on the predetermined time interval known as training session time interval, with the expectation that the queries occurring within the training session time interval are semantically relevant queries.

The threshold calculation module 214 further analyzes the segmented training search sessions to identify one or more semantically related training set queries. In one implementation, the training set queries can be a first predetermined number of commonly occurring queries, say m number of queries, extracted from the query log for, for example corresponding to a definite period like one month of query log data associated with the user. For each and every query in the training set, a second predetermined number of suggested queries, say n, relevant to the query are generated. The relevance information obtained can then be used to construct a candidate suggestion query set. The number of the candidate suggestion query in the set may be with m*n number of queries present in the candidate suggestion query set. In one implementation, the suggested queries relevant to the query can be determined either by the mutual information analysis or the cosine similarity analysis.

The threshold calculation module 214 classifies the relevant suggested queries into one or more groups based on the relevance level of the suggested queries. In one implementation, the grouping process can be either automated or performed manually. The groups are then labeled based on the level of relevance. In one implementation, the groups can be labeled as relevant, quite relevant, and irrelevant. In other implementations, the groups can be labeled in a different manner. After labeling, the threshold calculation module 214 determines the threshold 220 for each group. Toward this end, the similarity calculation module 112 display the semantically high relevant keyword sets filtered by the threshold 220 for further processing.

Exemplary Processes

Exemplary methods of determining keyword set relevance to match the advertiser's keywords are described below. Some or all of these methods may, but need not, be implemented at least partially in an architecture such as that shown in FIGS. 1 & 2. Also, it should be understood that certain acts in the methods need not be performed in the order described, may be modified, and/or may be omitted entirely, depending on the circumstances.

Figure 3:
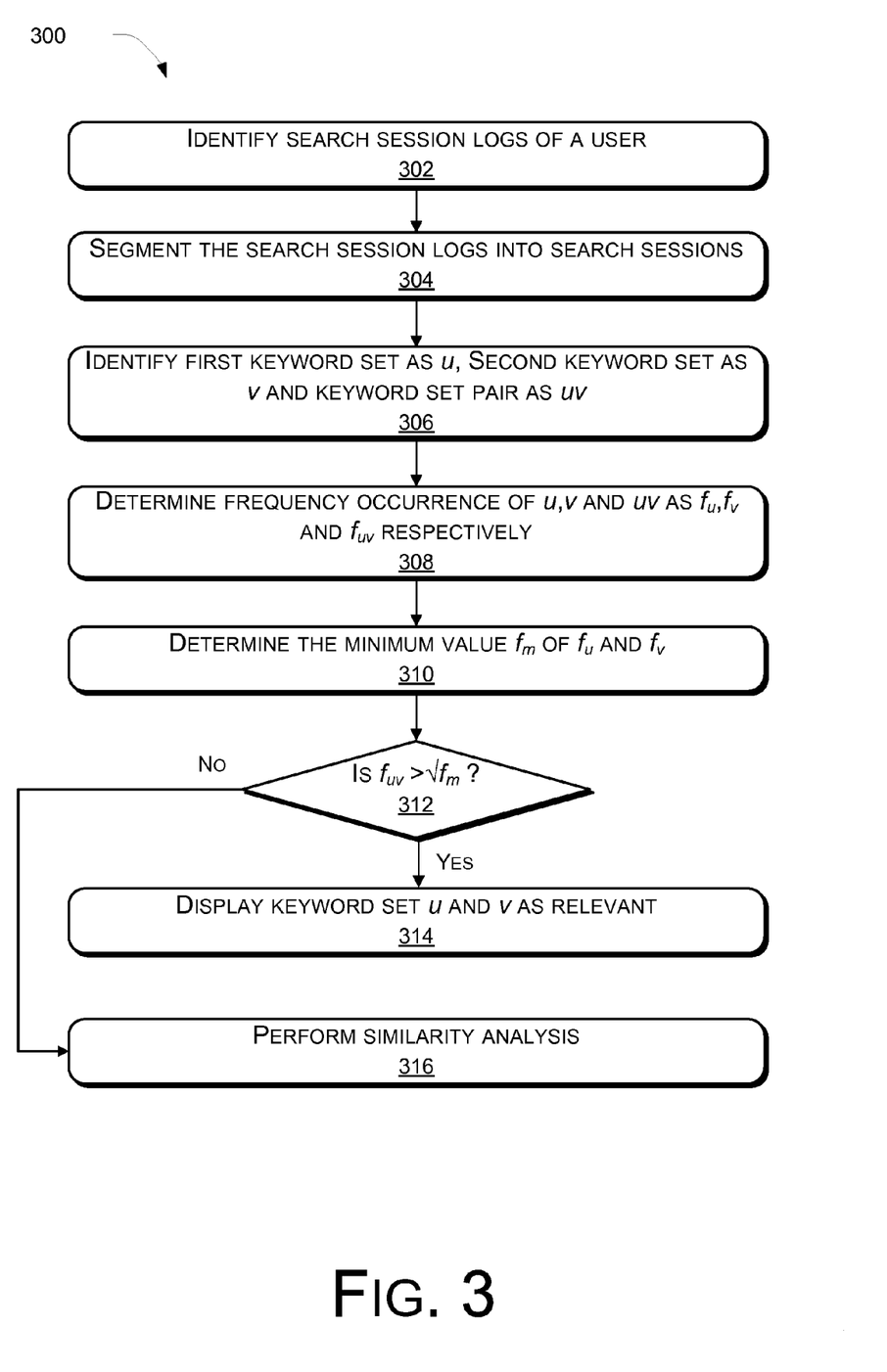
FIG. 3 illustrates an exemplary method for determining keyword set relevance.

FIG. 3 illustrates an exemplary method 300 for determining the keyword sets that have high semantic relevance. The order in which the exemplary method 300 is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 302, a user and respective search session logs of the user are identified. In one implementation, the session segmentation module 110 identifies the search session logs of the user after identifying the user. In one implementation, the user can be identified either by GUID or by UUID. Then, the similarity calculation module 112 can sort the search session logs to align data from at least one raw session log of the user.

At block 304, the search session logs are segmented into one or more search sessions. The segmentation of the search session logs can be based on numerous factors, like sessions that are active for a definite time period. For example, the session segmentation module 110 segments the sorted search session logs of the user into one or more search sessions based on the predetermined session time interval. In one implementation, the segmentation is performed based on the predetermined session time interval as the queries derived within the predetermined session time interval are estimated to be semantically relevant.

At block 306, one or more keyword sets from search queries in a search session are identified. In one implementation, the similarity calculation module 112 identifies a first and a second keyword set from the series of queries in a search session. The search session is analyzed to identify the list of semantically relevant keyword set. The list of semantically relevant keyword sets can include at least a first keyword set and a second keyword set. In one implementation, the first and the second keyword sets are stored as the other program data 222 in the memory 208. The first keyword set can be designated as u and the second keyword set can be designated as v and the keyword pair that comprises of both the first and second keyword sets can be designated as uv. The keyword set pair uv can be any combination of u and v regardless of the order of the keyword sets.

At block 308, the frequency occurrence of the first and the second keyword sets and the keyword set pair is determined. In one implementation, similarity calculation module 112 determines the frequency occurrence of the identified keyword sets and the keyword set pair. The frequency occurrence of the first keyword set u and the second keyword set v can be determined and represented as $f_u$ and $f_v$ respectively. In a similar fashion, the similarity calculation module 112 determines the frequency of occurrence of the keyword set pair uv represented as $f_{uv}$.

At block 310, a minimum value between the frequency occurrence of the first and the second keyword sets is determined. In one implementation, the similarity calculation module 112 determines minimum frequency occurrence number between $f_u$ and $f_v$. The minimum frequency occurrence number denoted as $f_m$ is determined by the following mathematical expression (6):

$$f_m = \min(f_u, f_v) \qquad (6)$$

At block 312, the frequency occurrence of the keyword pair is compared with the value proportional to the minimum frequency occurrence number. The comparison forms a basis for determining semantically relevant keywords corresponding to a keyword set. In one implementation, the similarity calculation module 112 determines whether the keyword sets u and v are semantically relevant or not, based on the following relationship represented as:

$$f_{uv} > \sqrt{f_{min}} \qquad (7)$$

The determination of the above relationship is made at block 312, i.e., if the "YES" path is traced to block 314, then the keyword set u and v are determined as semantically relevant and if the "NO" path is traced to block 316, then the keyword sets u and v may or may not be semantically relevant.

At block 314, the keyword sets under consideration are displayed to be relevant. For example, the similarity calculation module 112 displays the first and the second keyword sets as semantically relevant keyword sets when the "YES" path is traced from the block 312.

At block 316, a similarity analysis is performed if the relation as specified in block 312 is not satisfied. In one implementation, the similarity calculation module 112 performs similarity analysis to determine the semantically relevant keyword sets. In one implementation, the similarity analysis performed by the similarity calculation module 112 can be either the mutual information analysis or the cosine similarity analysis to determine whether the keyword sets are semantically relevant or not.

Figure 4:
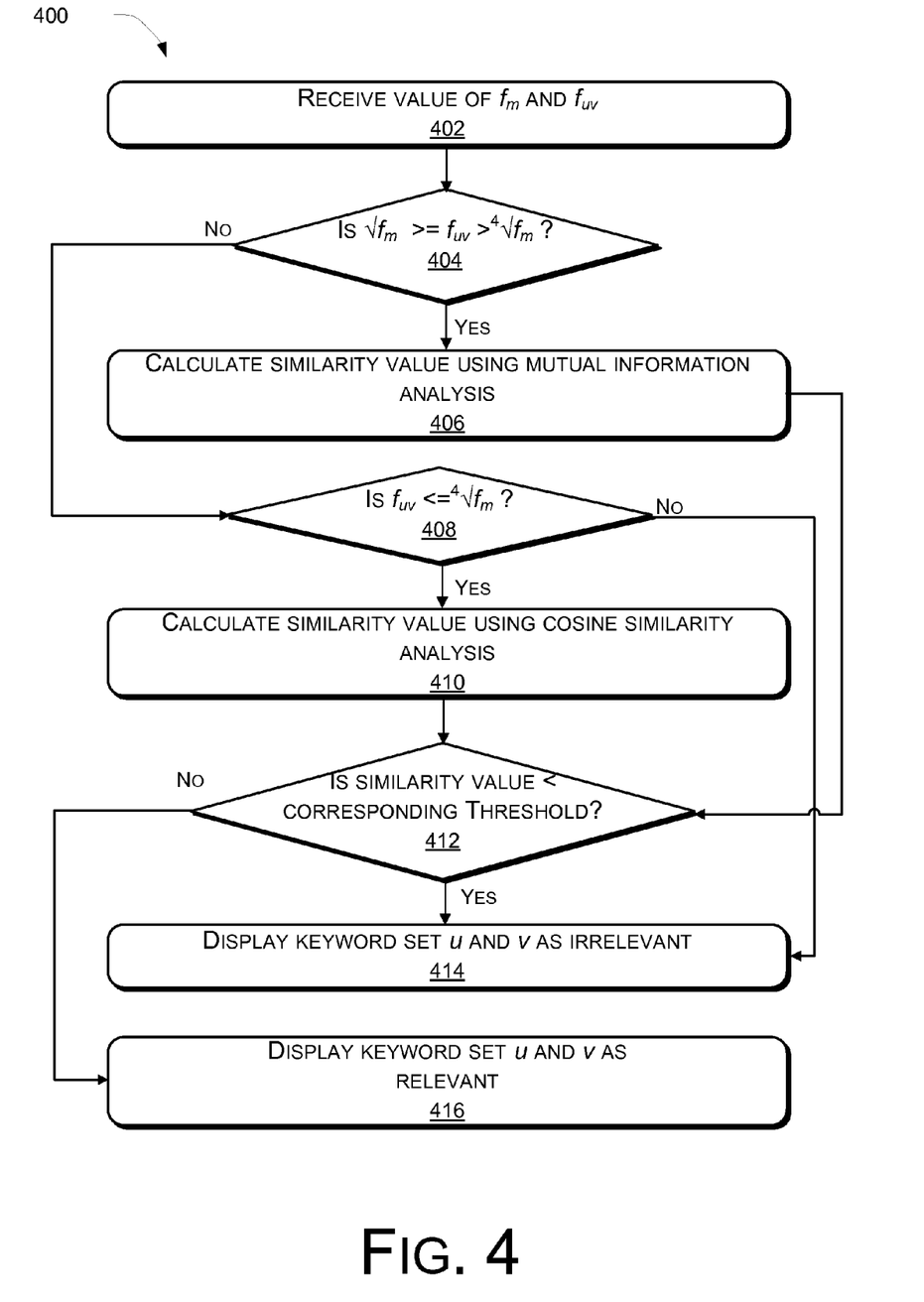
FIG. 4 illustrates an exemplary method for performing similarity analysis.

FIG. 4 illustrates an exemplary method 400 for performing a similarity analysis to determine one or more semantically relevant keyword sets.

At block 402, values corresponding to minimum frequency occurrence number and the frequency occurrence of the keyword set pair are received. In one implementation, the similarity calculation module 112 receives the frequency occurrence number $f_{uv}$ of the keyword pair uv and the minimum frequency occurrence number $f_m$.

At block 404, a determination is made to ascertain whether the given keyword sets are semantically relevant or not on the basis of the minimum frequency occurrence number and the frequency occurrence of the keyword pair. In one implementation, the similarity calculation module 112 determines whether the keyword sets u and v are semantically relevant or not, based on the following relationship represented as:

$$\sqrt{f_m} >= f_{uv} > \sqrt[4]{f_m} \quad (8)$$

If the above relation is satisfied, the "YES" path is traced to block 406 indicating the keyword sets u and v as semantically relevant. In another implementation, the degree of relevance can be measured in terms of a similarity value indicating the similarity between the keyword sets. The similarity value as indicated can be determined by the mutual information analysis. Conversely, if the "NO" path is traced to block 408, then the keyword sets u and v may or may not be semantically relevant.

At block 406, the similarity value is calculated based on number of queries including the search term. In one implementation, the similarity calculation module 112 computes the similarity value between the keyword sets u and v by the mutual information analysis. The mutual information analysis can be represented by the following equation (9):

$$MI(q_u, q_v) = p(q_u, q_v) * \log \frac{p(q_u, q_v)}{p(q_u) * p(q_v)} \quad (9)$$

In the above equation (9), $$p(q_u, q_v) = \frac{C_{u,v}}{N}, \; p(q_u) = \frac{C_u}{N}, \; p(q_v) = \frac{C_v}{N},$$

for the keyword sets u and v and N being the total number of query sessions. C indicates number of queries including a keyword set. For example, $C_u$, $C_v$ and $C_{uv}$ would indicate the number of queries that include the keyword set u, v and keyword pair uv respectively, occurring in all sessions.

At block 408, the similarity calculation module 112 determines whether the keyword sets u and v are semantically relevant or not, based on the following relationship represented as:

$$f_{uv} <= \sqrt[4]{f_m} \quad (10)$$

The determination of the above relationship is made at block 408, i.e., if the "YES" path is traced to block 410, the keyword sets u and v are determined as semantically relevant with the degree of relevance being measured in terms of similarity value between the keyword sets. According to one implementation, the similarity value can be determined by the cosine similarity analysis. If the "NO" path is traced to block 414, then the keyword sets u and v are determined as semantically irrelevant.

At block 410, the similarity calculation module 112 computes the similarity value between the keyword sets u and v using cosine similarity analysis. In one implementation, the cosine similarity analysis can be represented by the following equation (11):

$$\cos(q_u, q_v) = \frac{\sum_{\forall qj} C_{u,j} \cdot C_{v,j}}{\sqrt{\sum_{\forall qj} C_{u,j}^2} \cdot \sqrt{\sum_{\forall qj} C_{v,j}^2}} \quad (11)$$

wherein the different variables possess the same meaning as indicated previously.

At block 412, a comparison is made between the similarity value and an associated threshold value. In one implementation, the similarity calculation module 112 compares the similarity value with the threshold 220. In one implementation, the threshold 220 can be determined by the threshold calculation module 214. The similarity calculation module 112 determines whether the similarity value is lesser than the threshold 220 or not. For example, when the similarity value is lesser than the threshold 220, the "YES" path is traced to the block 414 to determine that the keyword sets u and v are semantically irrelevant or non relevant On the other hand, when the similarity value is greater than or equal to the threshold 220, the "NO" path is traced to block 416 to determine that the keyword sets u and v are semantically relevant.

At block 414, keyword sets that are determined as irrelevant are displayed. In one implementation, the similarity calculation module 112 displays the keyword sets u and v as semantically irrelevant when the "YES" path is traced from the block 412, i.e., when the similarity value between the keyword sets u and v falls below the threshold 220, the keyword sets are determined as semantically non relevant and displayed as irrelevant keyword sets.

At block 416, keyword sets determined as relevant are displayed. In one implementation, the similarity calculation module 112 displays the keyword sets u and v as semantically relevant when the "NO" path is traced from the block 412 i.e. when the similarity value between the keyword sets u and v exceeds the threshold 220. For all similarities values that are greater than the threshold 220, the keyword sets are semantically relevant and displayed as relevant keyword sets.

Figure 5:
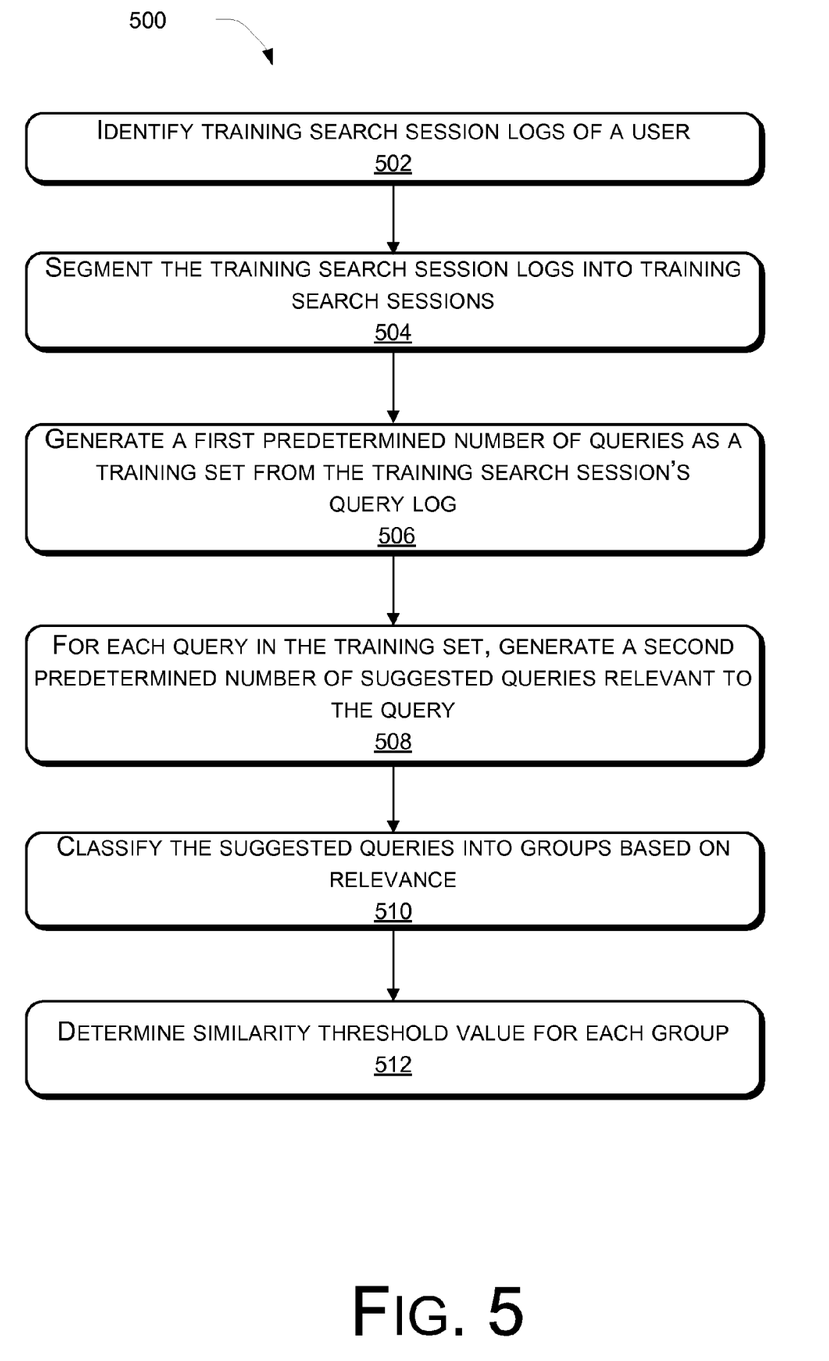
FIG. 5 illustrates an exemplary method for calculating a similarity threshold.

FIG. 5 illustrates an exemplary method for calculating the threshold 220.

At block 502, the threshold calculation module 214 identifies one or more training search session logs of the user. In one implementation, the user is identified by the threshold calculation module using either GUID or UUID. After identifying the user, the threshold calculation module 214 identifies the training search session logs of the user.

At block 504, training search session logs are segmented to obtain training search sessions. In one implementation, the threshold calculation module 214 segments the training search session logs of the user into one or more training search sessions based on a predetermined training session time interval.

At block 506, a first predetermined number of queries are generated. The first predetermined number of queries can be considered to be a training set form the training search sessions query logs. For example, the threshold calculation module 214 generates a first predetermined number of commonly occurring queries from the training search session logs, for example m, collectively referred as a training set. In one implementation, the training search session logs can be extracted from a query log that is pertinent to a definite time period and associated with the user.

At block 508, a second predetermined number of suggested queries are generated for each of the queries in the training set. The generated suggested queries are such that they are relevant to the query in consideration. In one implementation, the threshold calculation module 214 derives a second predetermined number of suggested queries, as indicated by a value say n, relevant to each query in the training set. The relevancy of the query with the second predetermined number of the suggested queries n can be obtained by various relevance or similarity analysis methods. In one implementation, the similarity analysis can be performed either by the mutual information analysis or by the cosine similarity analysis. The relevance information obtained can then be used to construct a candidate suggestion query set, with m*n number of queries present in the candidate suggestion query set. Based on the relevance information present in the candidate suggestion query set, the relevant suggested queries are obtained.

At block 510, the suggested queries are classified into one or more groups on the basis of their relevance. In one implementation, the threshold calculation module 214 classifies the relevant suggested queries into one or more groups. The groups are then labeled based on the level of relevance. In one implementation, the groups are labeled as "quite relevant", "relevant", and "irrelevant". In other implementations, the groups are labeled in a different fashion. The process of labeling the groups can be either automated or performed manually, for example, by a system administrator.

At block 512, the similarity threshold value associated with each of the groups is determined. In one implementation, the threshold calculation module 214 determines the threshold 220 for each of the group or each of the relevance level. The threshold 220 can be either the mutual information threshold or the cosine similarity threshold as determined by the threshold calculation module 214.

In another implementation, the threshold 220 can be used to filter the keyword sets that have high semantic relevance. The filtered semantically high relevant keyword sets interchangeably called as advertiser's keyword sets are then used by advertisers or others for further processing.

Any of the acts described above with respect to any method may be implemented by a processor or other computing device based on instructions stored on one or more computer-readable media. Computer-readable media can be any available media that can be accessed locally or remotely by the resource modeling application. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the resource modeling application. Communication media typically embodies computer-readable instructions, data structures, program modules, or other data on any information delivery media. Combinations of the any of the above should also be included within the scope of computer-readable media.

CONCLUSION

Although the invention has been described in language specific to structural features and/or methodological acts for implementing an exemplary method for determining relevant keyword set, it is to be understood that the invention is not necessarily limited to the specific features or acts described. Rather, the specific features and acts are disclosed as exemplary forms of implementing the invention.

What is claimed is:

1. A method comprising:
    identifying search session logs of a user;
    segmenting the search session logs into search sessions based at least on a predetermined session time interval;
    analyzing each of the search sessions to determine a first keyword set and a second keyword set;
    combining the first keyword set and the second keyword set to form a pair of keyword sets, wherein the pair is represented as at least one of any combination of the first keyword set and the second keyword set;
    determining a minimum frequency as a smaller of a frequency at which the first keyword set occurs and a frequency at which the second keyword set occurs;
    comparing a value proportional to the minimum frequency with a frequency at which the pair of keyword sets occur;
    calculating semantic relevance between the first and the second keyword sets based at least in part on the comparing, wherein the calculating comprises:
        computing a similarity value between the first and second keyword sets based in part on a mutual information analysis or a cosine similarity analysis; and
        comparing the similarity value with a similarity threshold, wherein the similarity threshold is determined by:
            generating a training set which includes a predetermined number of queries obtained from one or more training search sessions;
            identifying a predetermined number of suggested queries based on an associated relevance of the suggested queries to each query in the training set;
            categorizing the suggested queries into one or more groups based on the associated relevance; and
            ascertaining the similarity threshold based on the associated relevance corresponding to at least one of the one or more groups; and
    displaying one or more semantically relevant keyword sets based on the calculation.

2. The method of claim 1, wherein the identifying comprises:
    identifying the user using either a globally unique identifier (GUID) or a universally unique identifier (UUID); and
    aligning data from at least one raw session log with the user.

3. The method of claim 1, wherein the analyzing comprises:
    determining a semantic relationship between user queries made during the search sessions to compose a set of related keyword sets, the set of related keyword sets comprising at least the first keyword set and the second keyword set.

4. The method of claim 1, wherein the semantic relevance is determined by a relationship:

$$f_{uv} > \sqrt{f_{min}(f_u, f_v)}$$

where $f_u$ is the frequency of the first keyword set,
$f_v$ is the frequency of the second keyword set,
$f_{uv}$ is the frequency of the pair, and
$f_{min}$ is the minimum frequency.

5. The method of claim 1, wherein the one or more semantically relevant keyword sets are determined by the mutual information analysis based on a relationship:

$\sqrt{f_m} >= f_{uv} > \sqrt[4]{f_m}$ where $f_{uv}$ is the frequency of the pair, and
$f_m$ is the minimum frequency,
wherein the mutual information analysis is conducted based on equation, $$MI(q_u, q_v) = p(q_u, q_v) * \log \frac{p(q_u, q_v)}{p(q_u) * p(q_v)}$$

where $p(q_u, q_v) = \frac{C_{u,v}}{N}$, $p(q_u) = \frac{C_u}{N}$, $p(q_v) = \frac{C_v}{N}$, N is the total number of query sessions,
$C_u$ is the number of queries for keyword set u occurring in all sessions,
$C_v$ is the number of queries for keyword set v occurring in all sessions, and
$C_{uv}$ is the number of queries for keyword set u and v together as the pair occurring in all sessions.

6. The method of claim 1, wherein the one or more semantically relevant keyword sets are determined by the cosine similarity analysis based on a relationship:

$f_{uv} >= \sqrt[4]{f_m}$, where $f_{uv}$ is the frequency of the pair, and $f_m$ is the minimum frequency,
wherein the cosine similarity analysis is conducted based on equation, $$\cos(q_u, q_v) = \frac{\sum_{j=1}^{n} C_{n,j} * C_{v,j}}{\sqrt{\sum_{j=1}^{n} C_{n,j}^2} * \sqrt{\sum_{j=1}^{n} C_{v,j}^2}}$$

$C_u$ is the number of queries for keyword set u occurring in all sessions, and
$C_v$ is the number of queries for keyword set v occurring in all sessions.

7. A computing device comprising:
a memory;
one or more processors operatively coupled to the memory;
a session segmentation module maintained in the memory and executed on the one or more processors configured to segment search session logs of a user into search sessions and to identify a first keyword set and a second keyword set from a search session; and
a similarity calculation module maintained in the memory and executed on the one or more processors configured to:
  determine a minimum frequency as a smaller of a frequency at which the first keyword set occurs and a frequency at which the second keyword set occurs;
  combine the first keyword set and the second keyword set to form a keyword set pair;
  calculate a similarity value for the first and second keyword sets based at least in part on a comparison made between the minimum frequency and a frequency at which the keyword set pair occurs in the search session;
  compare the similarity value with a similarity threshold; and
  display one or more semantically relevant keyword sets based on the comparison; and
a threshold calculation module maintained in the memory and executed on the one or more processors configured to:
  generate a training set which includes a predetermined number of queries obtained from one or more training search sessions;
  identify a predetermined number of suggested queries for each query in the training set based on a relevance of the suggested queries to each query in the training set;
  categorize the suggested queries into one or more groups based on the relevance;
  determine a level of relevance for each of the one or more groups based on the relevance of the suggested queries categorized into each of the one or more groups; and
  determine the similarity threshold based in part on the level of relevance of at least one of the one or more groups.

8. The computing device of claim 7, wherein the similarity value is determined based on one or more of a total number of query sessions, a first number of queries including the first keyword set, a second number of queries including the second keyword set and a third number of queries including the keyword set pair.

9. A computer-readable data storage medium having a set of computer readable instructions that, when executed by a processor, perform acts comprising:
identifying search session logs of a user;
segmenting the search session logs into search sessions;
analyzing each of the search sessions to determine a first keyword set and a second keyword set;
combining the first keyword set and the second keyword set to form a pair of keyword sets;
determining a minimum frequency as a smaller of a frequency at which the first keyword set occurs and a frequency at which the second keyword set occurs;
comparing a value proportional to the minimum frequency with a frequency at which the pair of keyword sets occur;
computing semantic relevance between the first keyword set and the second keyword set based at least in part on the comparing, wherein the computing further comprises:
  measuring a similarity value between the first and second keyword sets based at least in part on the minimum frequency and the frequency at which the pair of keyword sets occur; and
  evaluating the similarity value against a similarity threshold, wherein the similarity threshold is computed by:
    generating a training set wherein the training set includes a first predetermined number of queries obtained from a training search session;
    recognizing a second predetermined number of suggested queries for each query in the training set based on a relevance of the suggested queries to the query, wherein the relevance is determined either by a mutual information analysis or a cosine similarity analysis; and
    determining a similarity threshold for each group of suggested queries, wherein the suggested queries are grouped into one or more groups based on the relevance; and displaying one or more semantically relevant keyword sets based on the computation.

10. The computer-readable data storage medium of claim 9, wherein the identifying comprises:
deriving semantically related user queries made during the search sessions to compose a set of related keyword sets wherein the set of related keyword sets comprise at least the first keyword set and the second keyword set.

11. The computer-readable data storage medium of claim 9, wherein the similarity value is measured based on one or more of a total number of query sessions, a first number of queries including the first keyword set, a second number of queries including the second keyword set and a third number of queries including the pair of keyword sets.

12. The method of claim 1, the calculating further comprising determining the one or more semantically relevant keyword sets based on the comparing when:

$$f_{uv} > \sqrt{f_m}$$

where $f_{uv}$ is the frequency at which the pair of keyword sets occur, and
$f_m$ is the minimum frequency.

13. The computer-readable data storage medium of claim 9, wherein the computing further comprises determining the one or more semantically relevant keyword sets based on the comparing when:

$$f_{uv} > \sqrt{f_m}$$

where $f_{uv}$ is the frequency at which the pair of keyword sets occur, and
$f_m$ is the minimum frequency.

14. The computer-readable data storage medium of claim 9, wherein the segmenting the search session logs into search sessions is based at least in part on a predetermined session time interval.

15. The computing device of claim 8, wherein:
when $\sqrt{f_m} \geq f_{uv} > \sqrt[4]{f_m}$, the similarity value is determined by mutual information analysis; and
when $f_{uv} = <\sqrt[4]{f_m}$, the similarity value is determined by cosine similarity analysis, where $f_{uv}$ is the frequency at which the keyword set pair occurs in the search session and $f_m$ is the minimum frequency.

16. The computing device of claim 15, the mutual information analysis is conducted based on the following equation:

$$MI(q_u, q_v) = p(q_u, q_v) * \log \frac{p(q_u, q_v)}{p(q_u) * p(q_v)}$$

where $p(q_u, q_v) = \frac{C_{u,v}}{N}$, $$p(q_u) = \frac{C_u}{N},$$

$$p(q_v) = \frac{C_v}{N},$$

N is the total number of query sessions,
$C_u$ is the number of queries for the first keyword set u occurring in all search sessions,
$C_v$ is the number of queries for the second keyword set v occurring in all search sessions, and
$C_{uv}$ is the number of queries for keyword set u and v together as the pair occurring in all sessions.

17. The computing device of claim 15, the cosine similarity analysis is conducted based on the following equation:

$$\cos(q_u, q_v) = \frac{\sum_{j=1}^{n} C_{u,j} * C_{v,j}}{\sqrt{\sum_{j=1}^{n} C_{u,j}^2} * \sqrt{\sum_{j=1}^{n} C_{v,j}^2}}$$

where $C_u$ is the number of queries for the first keyword set u occurring in all search sessions, and
$C_v$ is the number of queries for the second keyword set v occurring in all search sessions.

* * * * *